United States Patent
Buck

(10) Patent No.: US 9,723,795 B2
(45) Date of Patent: *Aug. 8, 2017

(54) DEVICE FOR GUIDING GROWTH OF SCAFFOLD BRANCHES

(71) Applicant: John T. Buck, Elmont, NY (US)

(72) Inventor: John T. Buck, Elmont, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/611,205

(22) Filed: Jan. 31, 2015

(65) Prior Publication Data
US 2015/0296722 A1    Oct. 22, 2015

Related U.S. Application Data

(63) Continuation of application No. 13/620,403, filed on Sep. 14, 2012, now Pat. No. 8,943,747.

(51) Int. Cl.
*A01G 17/10* (2006.01)
*A01G 17/04* (2006.01)

(52) U.S. Cl.
CPC ............ *A01G 17/10* (2013.01); *A01G 17/04* (2013.01)

(58) Field of Classification Search
CPC .. A01G 13/0243; A01G 17/10; A01G 13/105; A01G 9/12; A01G 13/10; A01G 17/12; A01G 13/0237; A01G 17/04; A01G 17/14; A01M 1/18
USPC ....... 47/42, 43, 4, 32.4, 32.5, 32.6; 248/689, 248/538, 219.3, 219.4, 218.4
See application file for complete search history.

(56) References Cited

U.S. PATENT DOCUMENTS

| | | | | | |
|---|---|---|---|---|---|
| 35,265 | A | * | 5/1862 | McIntyre | B27J 1/02 147/48 |
| 1,613,716 | A | * | 1/1927 | Mylaeus | A01G 17/10 182/187 |
| 1,653,083 | A | * | 12/1927 | Blaw | E04H 12/32 248/230.9 |
| 1,737,151 | A | * | 11/1929 | Derbyshire | E04H 12/32 131/256 |
| 1,867,485 | A | * | 7/1932 | Westover | A01G 17/10 47/43 |
| 1,886,531 | A | * | 11/1932 | Dalchow | A01G 17/10 24/115 A |
| 2,462,442 | A | * | 2/1949 | Wallace | A47G 33/04 248/538 |
| 2,941,767 | A | * | 6/1960 | Mogey | A47G 33/04 248/217.1 |
| 3,145,961 | A | * | 8/1964 | Holtzendorff | A47G 33/04 248/217.3 |
| 3,166,868 | A | * | 1/1965 | Prozeller | A01G 17/12 182/134 |
| 4,649,665 | A | * | 3/1987 | McBride | A01G 17/10 47/42 |
| 4,918,860 | A | * | 4/1990 | Breadner | A01G 17/10 47/42 |
| 5,492,302 | A | * | 2/1996 | Odom, Jr. | A47G 33/12 248/163.1 |

* cited by examiner

*Primary Examiner* — Trinh Nguyen

(57) ABSTRACT

Devices are provided for guiding the growth of scaffold branches, and in particular, devices for training scaffold branches to form wide crotch angles with main trunk of a tree.

10 Claims, 6 Drawing Sheets

DEVICE FOR GUIDING GROWTH OF SCAFFOLD BRANCHES

CROSS-REFERENCE TO RELATED APPLICATION

This application is a Continuation of U.S. patent application Ser. No. 13/620,403, filed on Sep. 14, 2012, which is now U.S. Pat. No. 8,943,747, the disclosure of which is fully incorporated herein by reference.

TECHNICAL FIELD

The field relates generally to devices for guiding the growth of scaffold branches, and in particular, devices for training scaffold branches to form wide crotch angles with a main trunk of a tree.

BACKGROUND

In the field of arboriculture, there are many techniques that are implemented for training young trees (such as fruit trees) to develop a proper number of wide-angled scaffold branches in a desirable arrangement along the trunk of the tree. In arboricultural terminology, a scaffold branch is one of the primary limbs radiating from the main trunk for stem) of a tree. All subordinate branches (such as lateral branches) stem from the scaffold branches. With the proper training of young fruit trees, these trees can eventually develop, over time, a desirable amount and arrangement of scaffold branches, resulting in fruit trees that can produce high yields of quality fruit.

In general, scaffold branches of fruit trees must be strong enough to support their own weight plus heavy crop loads (fruit) that grow on these branches, without splitting and breaking. The strength of as scaffold branch is based, in part, on the angle of attachment (referred to as "crotch angle") between the scaffold branch and the main tree trunk. Typically, scaffold branches having a wide crotch angle of attachment with the main tree trunk are much stronger than scaffold branches having narrow crotch angle of attachment with the main trunk. By way of example, FIGS. 1A and 1B illustrate scaffold branches with different crotch angles. In particular, FIG. 1A illustrates a portion of a tree having a main trunk (1) and a scaffold branch (2) with a very narrow crotch angle A, while FIG. 1B illustrates a portion of a tree having a main trunk (1) and a scaffold branch (2) with a wider narrow crotch angle A.

Typically, scaffold branches grow about 30 to 45 degrees above the horizontal. However, scaffold branches having a relatively wide crotch angle of attachment are much stronger than those with a relatively narrow crotch angle of attachment because a wide crotch angle allows strong connective wood to form in the crotch as well as on the sides and the lower portion of the scaffold branch attachment. On the other hand, scaffold branches having tighter crotch angles of attachment with the main trunk have tendency to be weaker for various reasons.

For example, as a tree grows, a scaffold branch having a narrow crotch angle of attachment may result in bark becoming imbedded deep within the crotch between the scaffold branch and tree trunk. This growth is referred to as "included bark," The growth of included bark weakens the attachment of the scaffold branch to the trunk because little or no connective wood forms in a sharp-angled crotch, which can lead to branch failure when the tree matures. While scaffold branches having smaller crotch angle attachments may be strongly attached in their early years, as these branches grow and become heavier and wore spread out, the branches are more inclined to split at the crotch due to, e.g., increased weight or external forces caused by rain, snow storms or winds. For example, FIG. 2 illustrates a tree wherein a mature scaffold branch (2) having many lateral branches (3) splits from the main trunk (1) due to weakness caused by a narrow crotch angle.

Furthermore, scaffold branches having tighter crotch angles of attachment with the main trunk have tendency to be weaker due to pathogens. In particular, when a scaffold branch has a crotch angle of attachment that is 45 degrees or less, the crotch meeting with the stem/trunk, is a pathway for diseases, which result from insects or airborne viruses, to enter the cambium of the tree and eventually cause the branch or the rest of the tree to die. Thus, in training a young tree, it is important to train scaffold branches to develop wide angles of attachment.

Conventional methods for training scaffold branches to form wide crotch angles make use of spring-type wooden clothespins which serve as braces that are positioned between the trunk and young scaffold branches to force the branches to form wide crotch angles with the main axis of the tree. However, clothespins do not provide a sturdy brace structure and are easily pushed upwards as the scaffold branch grows, thus forming a much less desirable "tighter" crotch angle. Moreover, the use of clothespins are problematic in the use of training young scaffold branches as the clothespins serving as braces can be easily dislodge from, or otherwise knocked off the tree due to bad weather conditions or animals.

SUMMARY

Exemplary embodiments of the invention generally include devices for guiding the growth of scaffold branches, and in particular, devices for training scaffold branches to form wide crotch angles with main trunk of a tree.

For example, in one exemplary embodiment of the invention, a device fir guiding growth of as tree branch includes a trunk connecting element to removably attach the device to a trunk of a tree, and a branch guiding element including a first guiding portion that extends from the trunk connecting element at a first angle from one end thereof. The first guiding portion includes a concave inner surface that is adapted to make contact, to an initial length of a branch extending from the trunk of the tree and force the initial length of the branch to grow at the first angle from the trunk of the tree. The first angle is an angle in a range of about 60 degrees to about 90 degrees.

In another exemplary embodiment of the invention, the branch guiding element further includes a second guiding portion that extends from an opposite end of the first guiding portion at a second from longitudinal axis of the first guiding portion. The second angle may be an angle in a range of about 45 degrees to about 60 degrees.

In another exemplary embodiment, the second guiding portion includes as second concave inner surface that is adapted to make contact to a length of the branch guideably forcing the branch to grow upwardly from the first guiding portion at an angle limited by the second angle.

These and other exemplary embodiments, features, and aspect of the present invention will become apparent from the following detailed description of preferred embodiments, which is to be read in conjunction with the accompanying, figures.

DETAILED DESCRIPTION OF EXEMPLARY EMBODIMENTS

Exemplary embodiments of the invention will now be described in further detail with reference to devices for guiding, the growth of scaffold branches, and in particular, devices for training scaffold branches to form wide crotch angles with main trunk of a tree. It is to be understood, however, that the techniques of the present invention are not limited to the devices and methods shown and described herein. Modifications to the illustrative embodiments will become apparent to those of ordinary skill in the art.

Figure 1B:
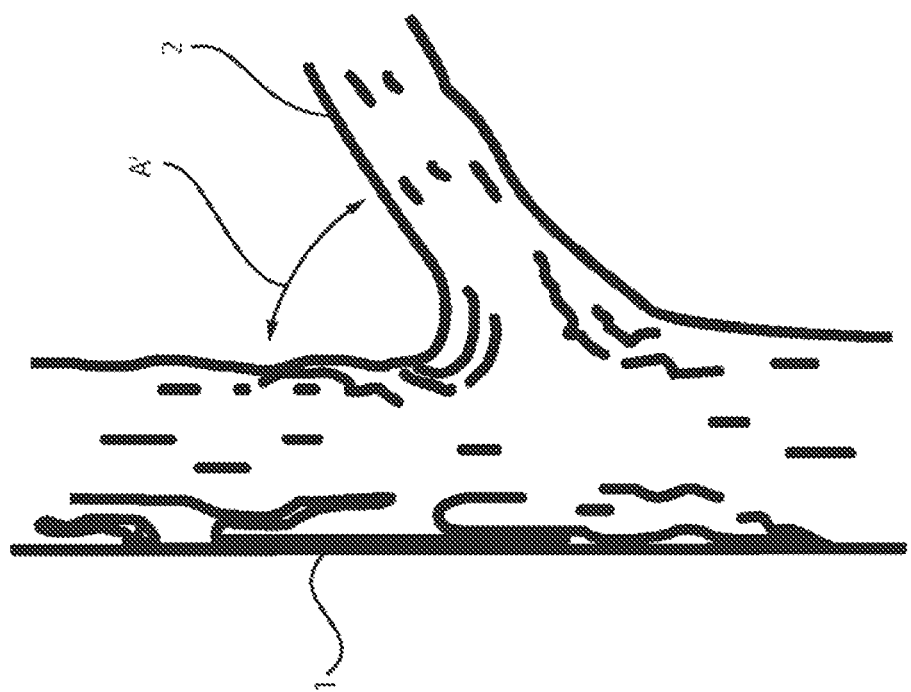
FIG. 1B illustrates a portion of a tree having a main trunk and a scaffold branch with a wide crotch angle.
Figure 1A:
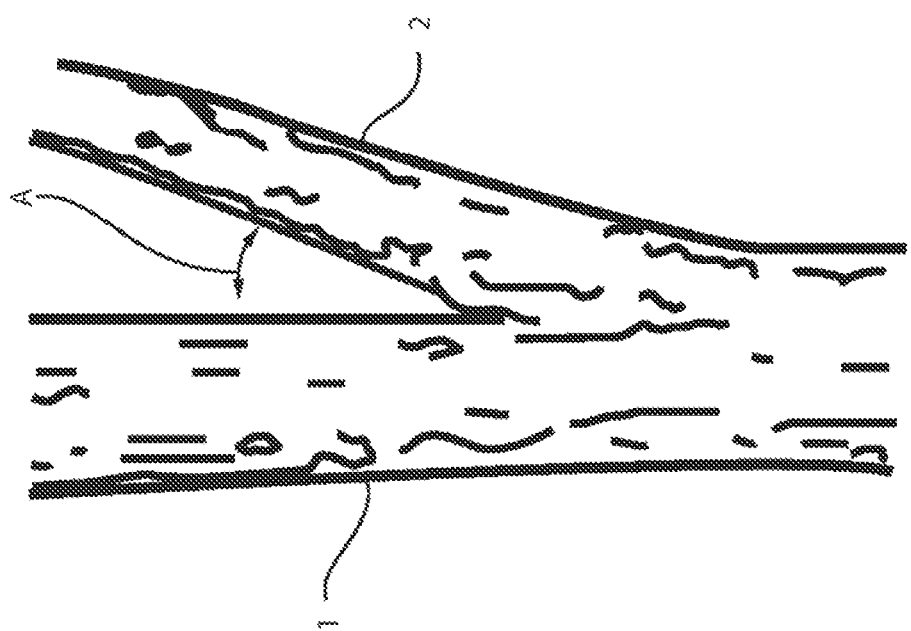
FIG. 1A illustrates a portion of a tree having a main trunk and a scaffold branch with a very narrow crotch angle.
Figure 2:
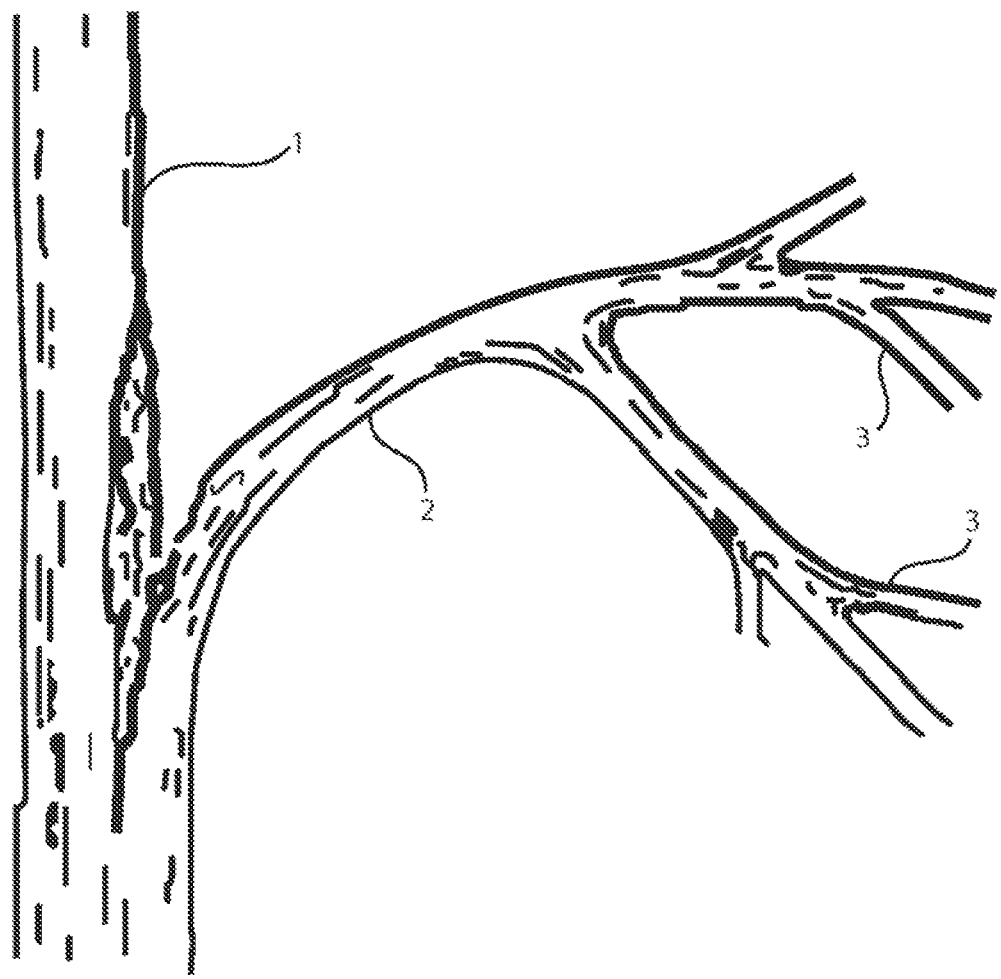
FIG. 2 illustrates a tree wherein a scaffold branch having many lateral branches splits from the main trunk due to weakness caused by a narrow crotch angle.
Figure 3:
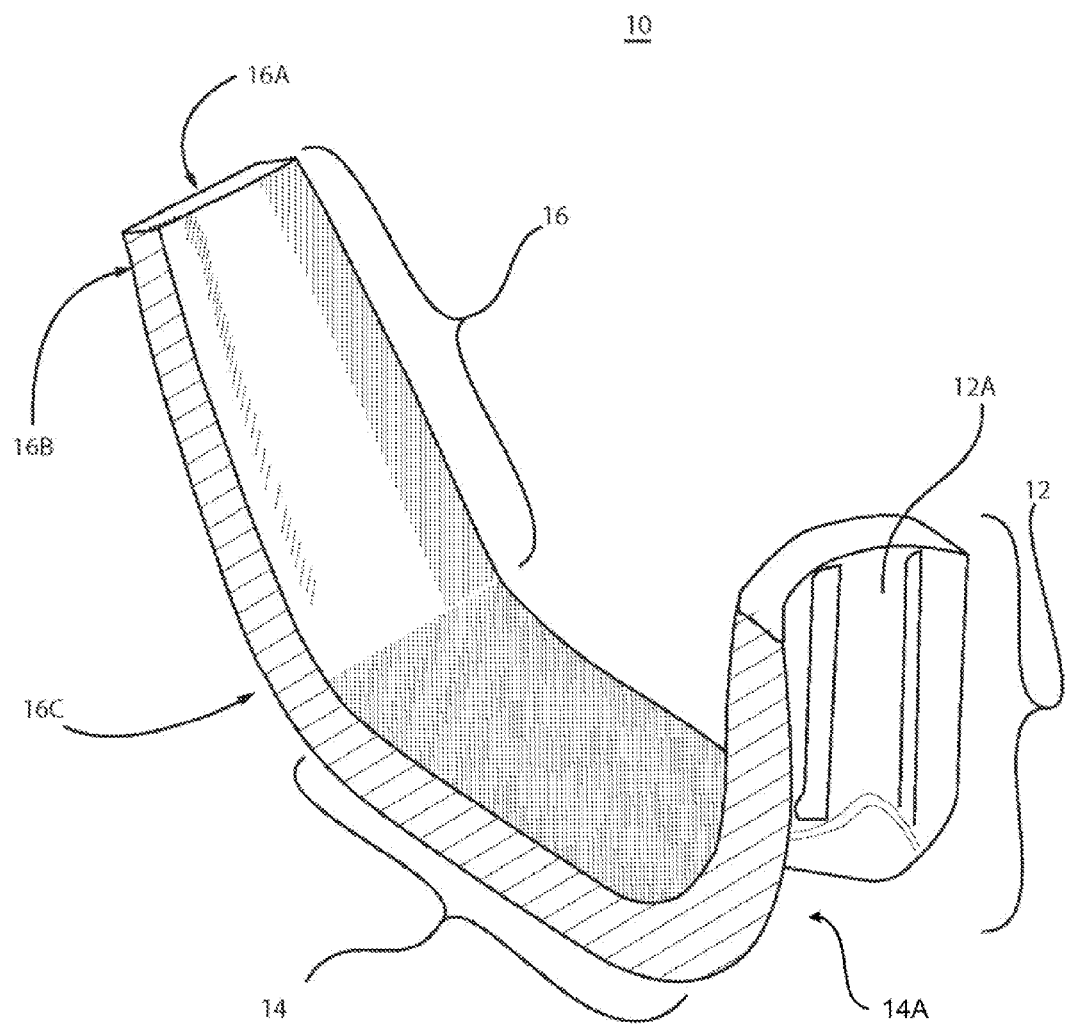
FIG. 3 a perspective view of a training device for guiding the growth of a scaffold branch according to an exemplary embodiment of the invention.
Figure 4:
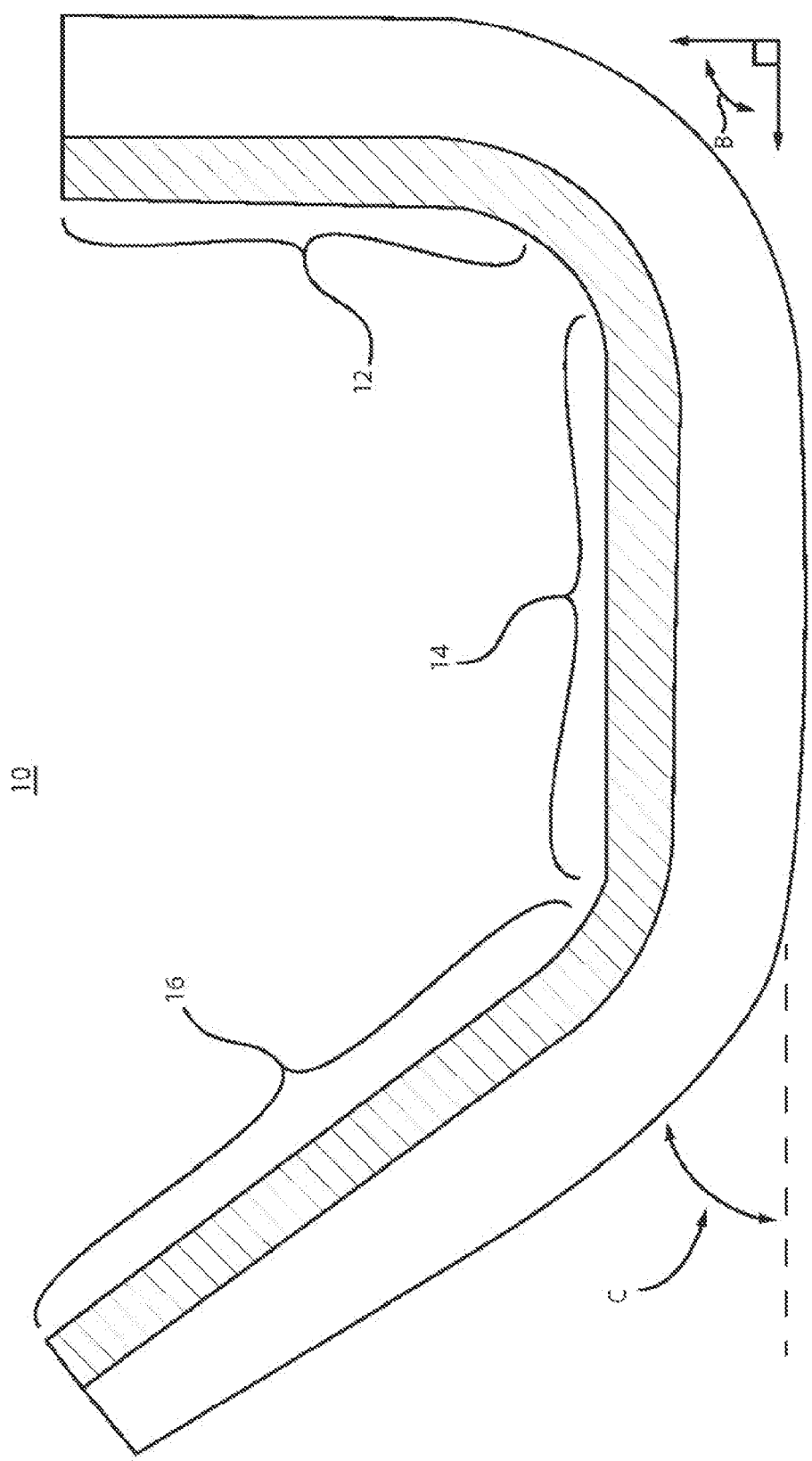
FIG. 4 is a side view of the training device of FIG. 3 according to an exemplary embodiment of the invention.
Figure 5:
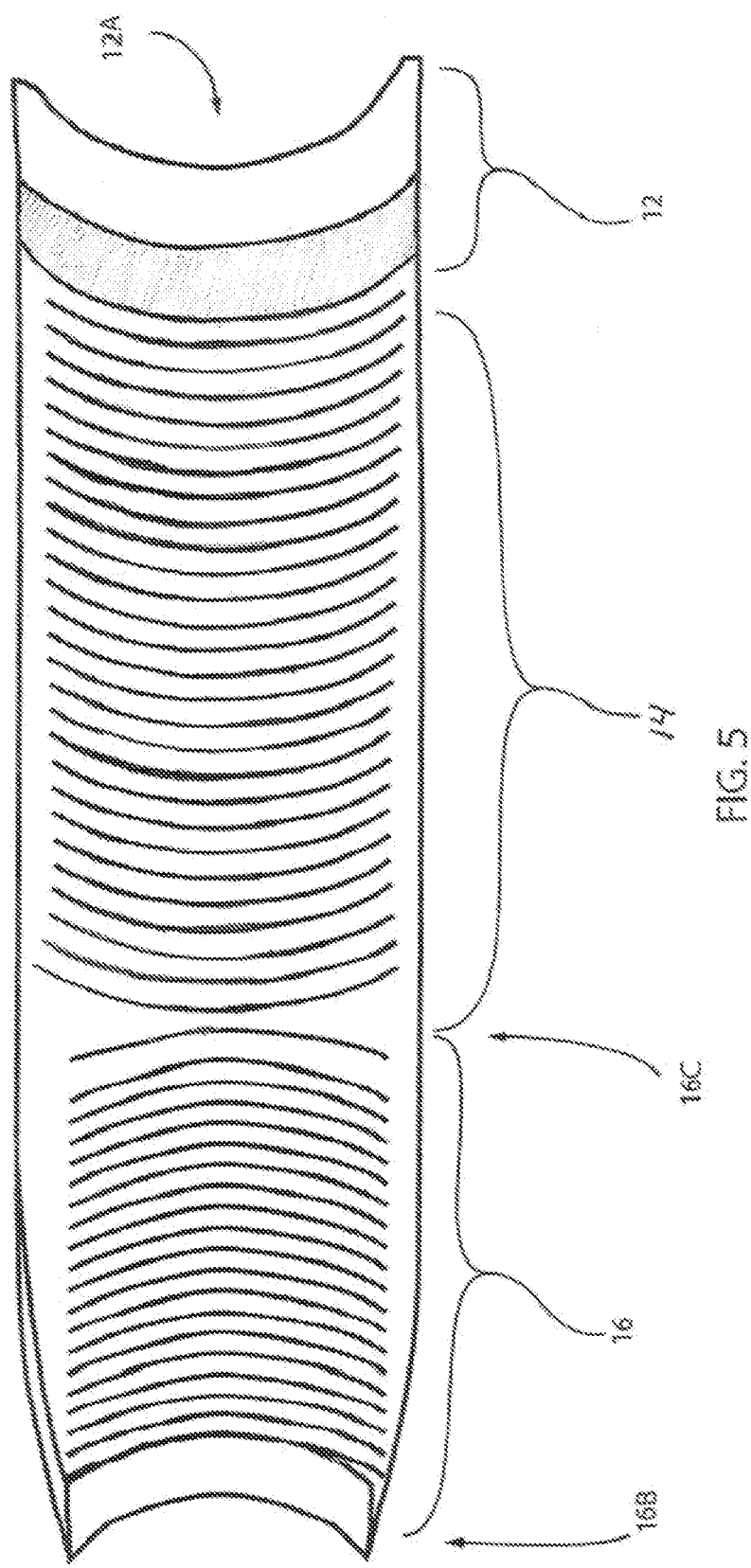
FIG. 5 is a top view of the training device of FIG. 3 according to an exemplary embodiment of the invention.

FIGS. 3, 4 and 5 schematically illustrate a training device (10) for guiding the growth of a scaffold branch according to an exemplary embodiment of the invention. In particular, FIG. 3 is a perspective view of the training device (10), FIG. 4 is a side view of the training device (10) and FIG. 5 is a top view of the training device (10) according to an exemplary embodiment of the invention. Referring collectively to FIGS. 3, 4 and 5, the training device (10) comprises a trunk connecting element (12) which is removably attachable to a trunk of a tree, and a branch guiding element having a first guiding portion (14) and a second guiding portion (16). The first guiding portion (14) extends from one end of the trunk connecting element (12) at an angle "B", and the second guiding portion (16) extends from an opposite end of the first guiding, portion (14) at an angle "C" from longitudinal axis of the first guiding portion (14). In one exemplary embodiment, the angle "B" is an angle in a range of about 60 degrees to about 90 degrees. In a preferred embodiment, angle "R" is 90 degrees, as shown in the FIG. 4, for example. Furthermore, in an exemplary embodiment of the invention, the angle "C" is an angle in a range of 45 degrees to about 60 degrees.

Moreover, as more readily seen in FIGS. 3 and 5, the trunk connecting element (12) includes a concave inner surface (12A), the first guiding portion (14) has a concave inner surface (14A) and the second guiding portion (16) has a concave inner surface (16A). Moreover, a tip end 16B of the second guiding portion (16) is less wide than an opposing end (16C) of the second guiding portion (16). In this manner, the second guiding portion (16) tapers down from the bottom end (16C) to the tip said (16B). For example, the width may be formed to taper from about ½ inch to about ⅜ of an inch.

Figure 6:
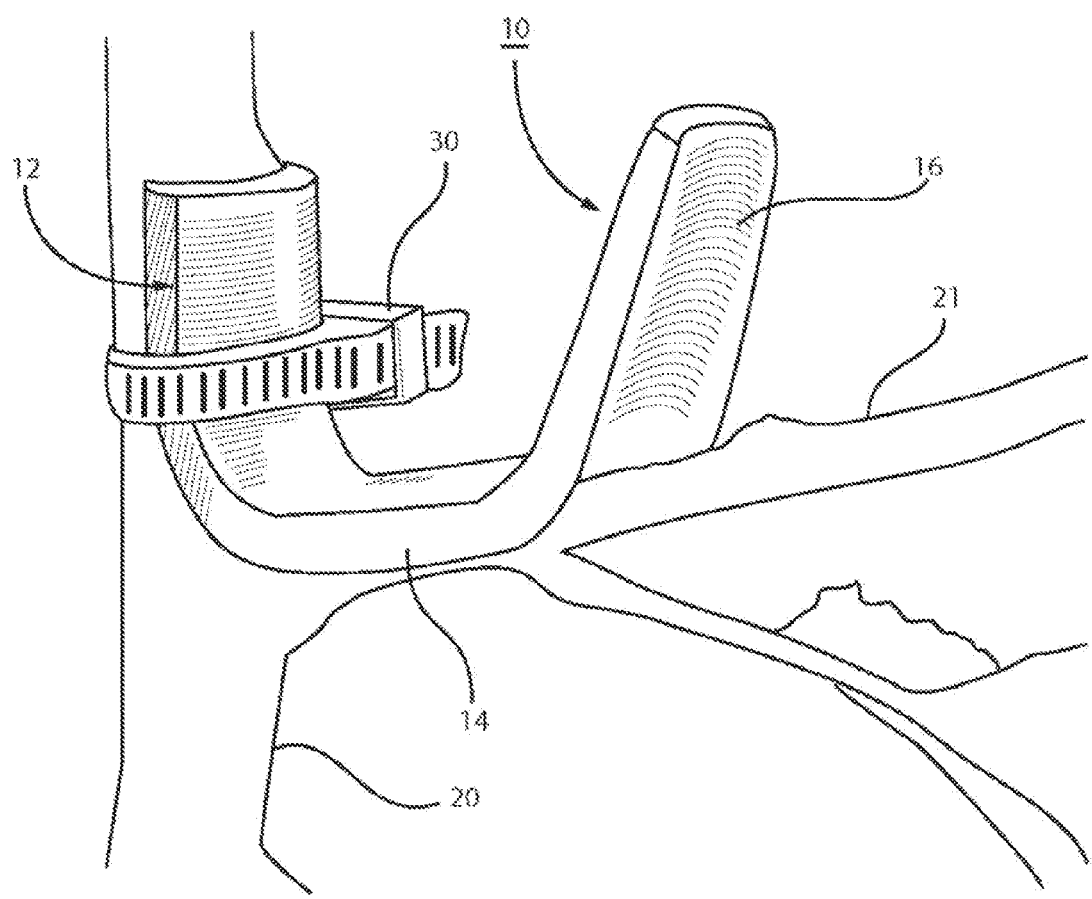
FIG. 6 illustrates a method for using the device of FIG. 3 for training a scaffold branch according to an exemplary embodiment of the invention.

FIG. 6 illustrates a method for using the training device (10) depicted in FIGS. 3, 4 and 5 for training a scaffold branch according to an exemplary embodiment of the invention. As shown in FIG. 6, the training device (10) is positioned on the trunk (20) of a tree, with the inner concave surface (12A) of the trunk connecting element (12) making contact with the surface of the bark and semi-encircling approximately halfway around the trunk (20) (fitting the contour of the tree trunk) directly above a scaffold branch (21) that is protruding from the trunk (20). The first guiding portion (14) rests on top of the protruding scaffold branch (21), with the inner concave surface (14A) of the first guiding portion (14) pressing against the scaffold branch (21), thereby forcing the scaffold branch (21) to grow outwardly substantially perpendicular to the stem (20) at a 90 degree angle (although in other exemplary embodiments that angle may be less than 90 degrees, as noted above). The length of the first guiding portion (14) may be, for example, about ½ inches long.

The trunk connecting element (12) may be removably attached to the trunk stem (20) by a connecting element (30) which can be a cable, a VELCRO strap, twist tie, etc., or other similar fasteners. The trunk connecting element (12) is tightly secured to the trunk to a degree that the device (10) will not be too constricting, to either cut into the cambium of the tree or show signs of indentations. With the device (10) positioned as shown and connected to the main trunk (20), the device (10) will not dislodge and fail off due to wind or any other circumstance and can only be removed by the individual who installed it.

When the device (10) is first placed on the scaffold branch (21) horizontally, due to the concave inner surface (14A) of the first guiding portion (14), the first guiding portion (14) will semi-encircle the branch (21) to ensure it will be guided within the inner cavity of the concave surface (14A) and be funneled to the second guide portion (16). The trainer (10) can be placed on a young scaffold branch bud when the branch is about 1.5 to 2 inches long, and still succulent (soft and flexible). At this stage of growth, if the young scaffold branch (21) is starting to grow with a narrow crotch angle, the trainer device (10) can be placed above the young scaffold branch (21) and pressed downed on the young scaffold branch (21) with some force against the inner surface (14A) of the first guiding portion (14) to straighten out the young branch (21). With this arrangement, since the first guiding portion (14) is formed at a 90 degree angle, for example, from the trunk connecting element (12), the young scaffold bud will be forced to grow outwardly from the trunk at 90 degrees, whereby the trainer device (10) prevents the young scaffold branch (21) from growing upwardly, thereby maintaining a 90 degree crotch angle from the tree trunk (20).

As the scaffold branch (21) grows roughly 1-2" past the end of the first guiding portion (14), the scaffold branch (21) may begin to grow upwardly and make contact to the inner surface (16A) of the second guiding portion (16). In this regard, the second guiding portion (16) prevents the scaffold branch (21) from bending upwardly (at the point where the first guiding portion (14) and second guiding portion (16) meet) at an angle that is greater than the angle "C" of the second guiding portion (16) (e.g., an angle "C" in range of about 45 to about 60 degrees, preferably about 47 degrees from the longitudinal axis of the first guiding portion (14)).

In this regard, the second guiding portion (16) effectively serves as a "spreader" device that forces the scaffold branch (21) to grow upwardly at angle limited by the angle of the second guiding portion (16), which serves several purposes. For example, the limited growth angle provided by the second guiding portion (16) allows the scaffold branch to grow upwardly and achieve sufficient flexibility so that crops (which subsequently grow on the branch as it matures) will not bend the scaffold branch past the horizontal line (the longitudinal axis along the first guiding portion (14)), thus causing the branch to break. This allows the scaffold branch to grow in full size and fruit bearing capacity. Moreover, the second guiding portion (16) prevents the scaffold branch from growing upwardly at too steep an angle or at angle where the branch can fold back on itself towards the trunk, thereby impeding the growth of other scaffold branches higher up on the main tree trunk.

Collectively, the first guiding portion (14) and second guiding portion (16) effectively guide the growth of young scaffold branches (outwardly from the trunk and upwardly at a limited angle) which effectively increases the width of the tree, increases the amount of light interspersed by the tree, provides structured strength, promotes the formation of fruit buds to fill in the tree, provides wider spreading angles of branches from the main stem, and forces growth of wide crotch angles outwardly (90 degrees) from the stem/trunk. This trains the grain of the wood to form strong crotches with desirable spread to thereby prevent the branch from tearing away from the tree when weight is applied to the branch in subsequent years. Moreover, the grain of the wood trained at the spread angle provided by the second guiding portion (16) will be more receptive at times when a grower intends to use limb spreaders to further spread the branch further from the trunk, as it will not cause the scaffold branch to tear away from the tree trunk itself.

The training device (10) is not a permanent device, and can be removed and used on other young scaffold branches of other trees or of the same tree having early growth branches that need to be trained. The training device (10) can be used to train young scaffold branches for a period of about 3-4 months, and then continually reused to train other branches. The training device (10) may be made of any suitable materials such as plastics or composite materials that are weather resistant, using manufacturing techniques such as injection molding, for example, or by CNC machining techniques.

It is to be understood that although the exemplary embodiments of FIGS. 3, 4 and 5 illustrate a training device (10) having both a first guiding portion (14) and a second guiding portion (16), a training device according to other exemplary embodiments of the invention may be formed to only include the first guiding portion (14). In this regard, the training device would train young scaffold branches to grow wide crotch angles, but provide no added structural functionality for "spreading" as provided by inclusion of the second guiding portion (16).

Although exemplary embodiments of the present invention have been described herein with reference to the accompanying figures, it is to be understood that the invention is not limited to those precise embodiments, and that various other changes and modifications may be made therein by one skilled in the art without departing from the scope of the appended claims.

What is claimed is:

1. A device for guiding growth of a tree branch, comprising:
    a tree trunk contact element comprising a concave inner surface, wherein the tree trunk contact element is configured to be disposed against a tree trunk with the concave inner surface of the tree trunk contact element in contact with a surface of the tree trunk; and
    a branch guiding element comprising a first guiding portion that extends from an end of the tree trunk contact element at a first angle, wherein the first guiding portion comprises a smooth concave inner surface, wherein the first guiding portion is configured to be disposed against a branch extending from the tree trunk with the smooth concave inner surface of the first guiding portion in contact with an upper surface of an initial length of the branch extending from the tree trunk and force the initial length of the branch to grow at the first angle from the tree trunk;
    wherein the tree trunk contact element and the branch guiding element each have an arc shaped cross section; and
    wherein the tree trunk contact element and the branch guiding element comprise a single piece of molded material.

2. The device of claim 1, wherein the first angle is an angle in a range of about 60 degrees to about 90 degrees.

3. The device of claim 1, wherein the branch guiding element further comprises a second guiding portion that extends from an end of the first guiding portion at a second angle from a longitudinal axis of the first guiding portion.

4. The device of claim 3, wherein the second angle is about 45 degrees to about 60 degrees.

5. The device of claim 3, wherein the second angle is about 47 degrees.

6. The device of claim 3, wherein the second guiding portion comprises a concave inner surface that is adapted to make contact to a second length of the branch and guideably force the second length of the branch to grow upwardly from the first guiding portion at an angle limited by the second angle.

7. The device of claim 3, wherein the second guiding portion has a tapered width along the length thereof.

8. The device of claim 7, wherein the width of the second guiding portion tapers from about ½ of an inch to about ⅜ of an inch.

9. The device of claim 1, wherein the first guiding portion has a length of about ½ inches.

10. The device of claim 1, further comprising strap fastener to removably attach the trunk contact element to a tree trunk.

* * * * *